US009360038B2

(12) United States Patent  
Ramberger et al.

(10) Patent No.: US 9,360,038 B2  
(45) Date of Patent: Jun. 7, 2016

(54) MOUNTING MECHANISM

(75) Inventors: Suitbert Ramberger, Bernex (CH); Pierre Bourquin, Segny (FR); Yves Cuvet, Surjoux (FR); Maurizio Vretenar, Plan-les-Ouates (CH)

(73) Assignee: CERN—European Organization for Nuclear Research, Geneva (CH)

( * ) Notice: Subject to any disclaimer, the term of this patent is extended or adjusted under 35 U.S.C. 154(b) by 596 days.

(21) Appl. No.: 13/698,124

(22) PCT Filed: May 18, 2010

(86) PCT No.: PCT/EP2010/003031  
§ 371 (c)(1),  
(2), (4) Date: Jan. 15, 2013

(87) PCT Pub. No.: WO2011/144222  
PCT Pub. Date: Nov. 24, 2011

(65) Prior Publication Data  
US 2013/0108391 A1    May 2, 2013

(51) Int. Cl.  
*H05H 9/00* (2006.01)  
*F16B 31/04* (2006.01)  
(Continued)

(52) U.S. Cl.  
CPC ............... *F16B 31/04* (2013.01); *F16B 43/00* (2013.01); *H05H 7/22* (2013.01); *F16B 5/0266* (2013.01); *F16B 43/02* (2013.01)

(58) Field of Classification Search  
CPC ............... H01J 37/3171; H01J 37/08; H01J 2237/31701; H01J 49/068; H05H 9/00; H05H 7/22; Y10T 269/49904  
USPC ............. 315/111.81, 111.01, 111.11, 111.21, 315/111.31, 111.41, 111.51, 111.61, 315/111.71, 111.91, 500, 505; 250/423 R, 250/424, 425–427, 492.3; 313/412–414, 313/409, 383, 389, 390, 441–460, 364  
See application file for complete search history.

(56) References Cited

U.S. PATENT DOCUMENTS 2,545,595 A    3/1951    Alvarez  
2,874,326 A    2/1959    Christofilos et al.  
(Continued)

FOREIGN PATENT DOCUMENTS

DE    3842351 A1    6/1990  
JP    54111260 U    8/1979

OTHER PUBLICATIONS

International Search Report dated Feb. 22, 2011 to Patent Application PCT/EP2010/003031.  
(Continued)

*Primary Examiner* — Alexander H Taningco  
*Assistant Examiner* — Christopher Lo  
(74) *Attorney, Agent, or Firm* — Eschweiler & Associates, LLC (57) ABSTRACT

Disclosed herein is a mounting mechanism such as a drift tube mounting mechanism for mounting a drift tube provided in a drift tube accelerator vessel 10 via an elongate holding element 14. The mounting mechanism comprises a biasing mechanism comprising one or more disc spring members 46 for axially biasing the elongate holding element 14 with respect to the vessel towards a mounting position. The mounting mechanism further comprises a screw 58 having a head portion 60 and a shaft portion, said shaft portion comprising a threaded portion 64 for screwing into the elongate holding element 14. The mounting mechanism further comprises a bushing 66 comprising a sleeve portion 68 receiving at least a part of the screw shaft and separating the one or more disc spring members 46 from said screw shaft portion. The screw head portion 60 is configured to receive the axial biasing force generated by the one or more disc spring members 46.

15 Claims, 6 Drawing Sheets

(51) Int. Cl.
  *H05H 7/22*  (2006.01)
  *F16B 43/00* (2006.01)
  *F16B 5/02*  (2006.01)
  *F16B 43/02* (2006.01)

(56) References Cited

U.S. PATENT DOCUMENTS

| | | | | |
|---|---|---|---|---|
| 5,179,350 A | * | 1/1993 | Bower | ............... H05H 7/22 |
| | | | | 315/5.41 |
| 5,619,095 A | * | 4/1997 | Salyer | ............... H01J 29/894 |
| | | | | 313/477 R |
| 7,081,723 B2 | * | 7/2006 | Ratzinger | ............... H05H 9/00 |
| | | | | 315/500 |
| 7,868,564 B2 | * | 1/2011 | Iwata | ............... H05H 7/18 |
| | | | | 250/214 VT |
| 2011/0031888 A1 | * | 2/2011 | Datta | ............... H05B 33/0818 |
| | | | | 315/122 |

OTHER PUBLICATIONS

S. Ramberger, et al.; "Drift Tube Linac Design and Prototyping for the CERN Linac 4", Proceedings of Linac 2008, Victoria BC, Canada, Sep. 29, 2008, p. 184-186.

* cited by examiner

Fig. 1

PRIOR ART

Fig. 2

PRIOR ART

MOUNTING MECHANISM

FIELD OF THE INVENTION

The present invention relates to a mounting mechanism for mounting an elongate element on a structure. In a particular embodiment, the invention relates to a mechanism for mounting a drift tube in a drift tube accelerator via an elongate holding element.

PRIOR ART

Figure 1:
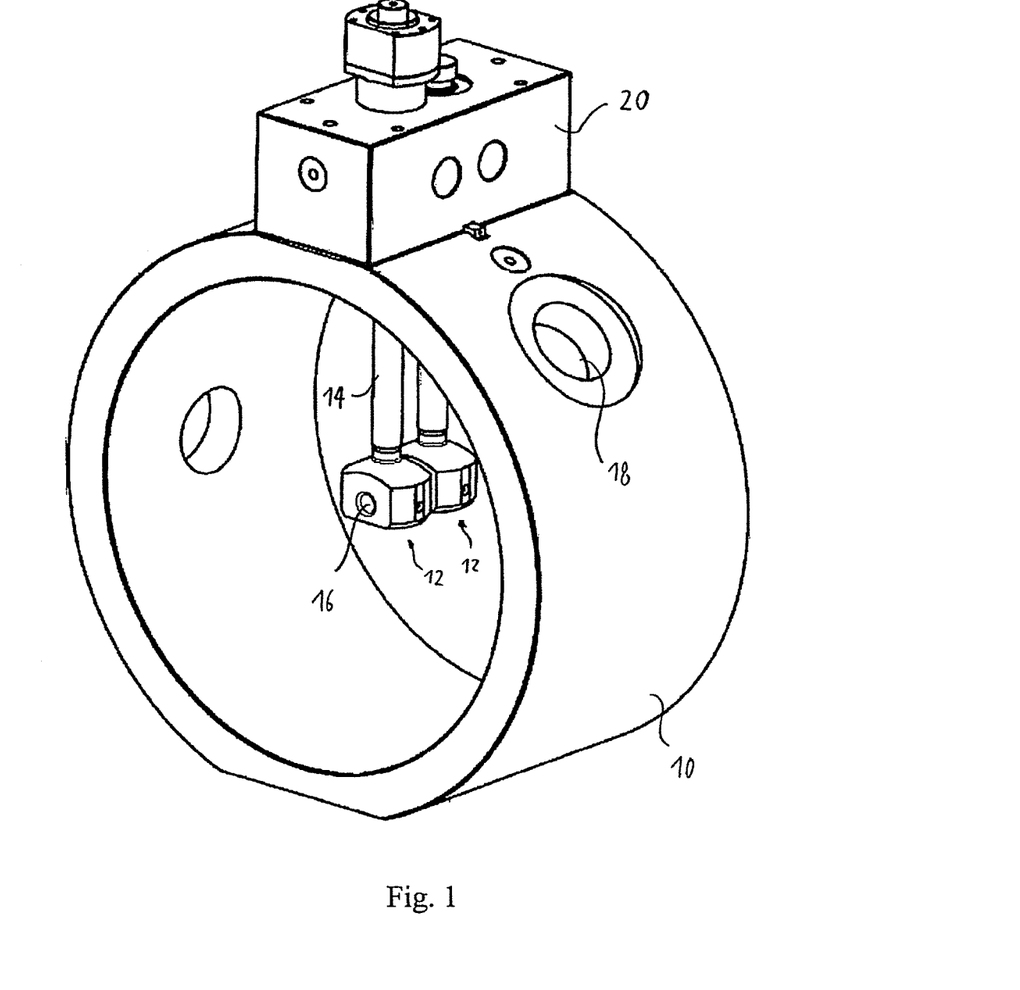
FIG. 1 is a perspective view of a drift tube accelerator mock-up employing a prior art mounting mechanism.

A prior art mounting mechanism related to the present invention has been developed by the applicant for use in drift tube accelerators. Drift tube linear accelerators for accelerating charged particles such as protons are known in the field. In FIG. 1, a mockup of a prior art drift tube accelerator is shown in a perspective view. As is seen in FIG. 1, a drift tube accelerator comprises an elongate cylindrical vessel, of which only a virtual slice is shown for illustration purposes in FIG. 1. Along the longitudinal axis of the vessel 10, a plurality of drift tubes 12 are disposed (only two of which are shown in the slice of FIG. 1), which are mounted via elongate holding elements 14 at a first end 14a thereof. Each drift tube 12 comprises an opening 16 for passing the particle beam and typically a quadrupole magnet (not shown) for beam shaping. In a typical application, the quadrupole magnets are alternately arranged focusing and defocusing permanent magnet quadrupoles. Also, typically the drift tubes 12 comprise a water cooling, and the holding elements 14, in addition to mounting the drift tubes along the central axis of the vessel 10, serve to supply and discharge cooling water from the drift tubes 12.

With further reference to FIG. 1, drift tubes 12 and the corresponding holding elements 14 are mounted on a carrier or girder 20 also shown in FIG. 1. While only two drift tubes 12 with corresponding holding elements are shown in FIG. 1, the person skilled in the art would appreciate that in a drift tube linear accelerator, tens or over a hundred of closely spaced drift tubes 12 will be provided. Also shown in FIG. 1 is a hole 18 for inserting a piston (not shown) such as to tune the RF frequency in the vessel cavity.

The present invention relates to a mechanism for mounting drift tubes such as drift tubes 12 of FIG. 1 with a carrier, such as girder 20 of FIG. 1. In this mounting, two general difficulties arise: First of all, since the carrier 20 is outside the vessel 10, the holding elements 14 at some point must penetrate through the vessel wall. Since during operation a vacuum is typically formed in the vessel 10, this means that a tight and reliable sealing must be provided between the holding element 14 and a corresponding opening in the vessel 10, through which the holding element 14 passes. The second problem is related to a high precision mounting of the drift tubes 12. The required precision of the position of the drift tube 12 (or the magnet included therein) is typically +/−0.1 mm. However, a typical diameter of vessel 10 is 50 cm, so that the cantilever length of the holding element 14 would typically be 25 cm. Due to this leverage, the holding elements 14 must be positioned with extreme precision, which is difficult to achieve.

The original approach for mounting drift tubes 12 via holding elements 14 taken by the applicant was to first assemble the drift tubes 12 and corresponding holding elements 14 and then adjusting the position of the holding elements 14 until the drift tube 12 was at the desired position. This approach, i.e. "assemble and adjust", called for a sealing mechanism between the holding elements 14 and the vessel 10 that allowed sufficient movement for adjusting the position of the holding elements 14 after assembly. This has been achieved according to prior art using rubber seals which allowed proper sealing of the vessel and sufficient flexibility for adjusting the position of the holding elements, but unfortunately they have proven to have an insufficient life time and reliability. The limited life time is mainly due to the X-ray radiation during the operation of the RF cavities. In an alternative approach by the applicant, bellows have been made from metal which allowed for a reliable and long life sealing as well as sufficient movability for adjusting the position of the drift tubes. However, due to the complex structure of the metal bellows, the manufacture thereof is cumbersome and costly.

Irrespectively of the sealing used, adjusting the holding elements 14 to the proper position after assembly turned out to be involved as well, thus significantly increasing the manufacturing time and costs of the accelerator as a whole.

Figure 2:
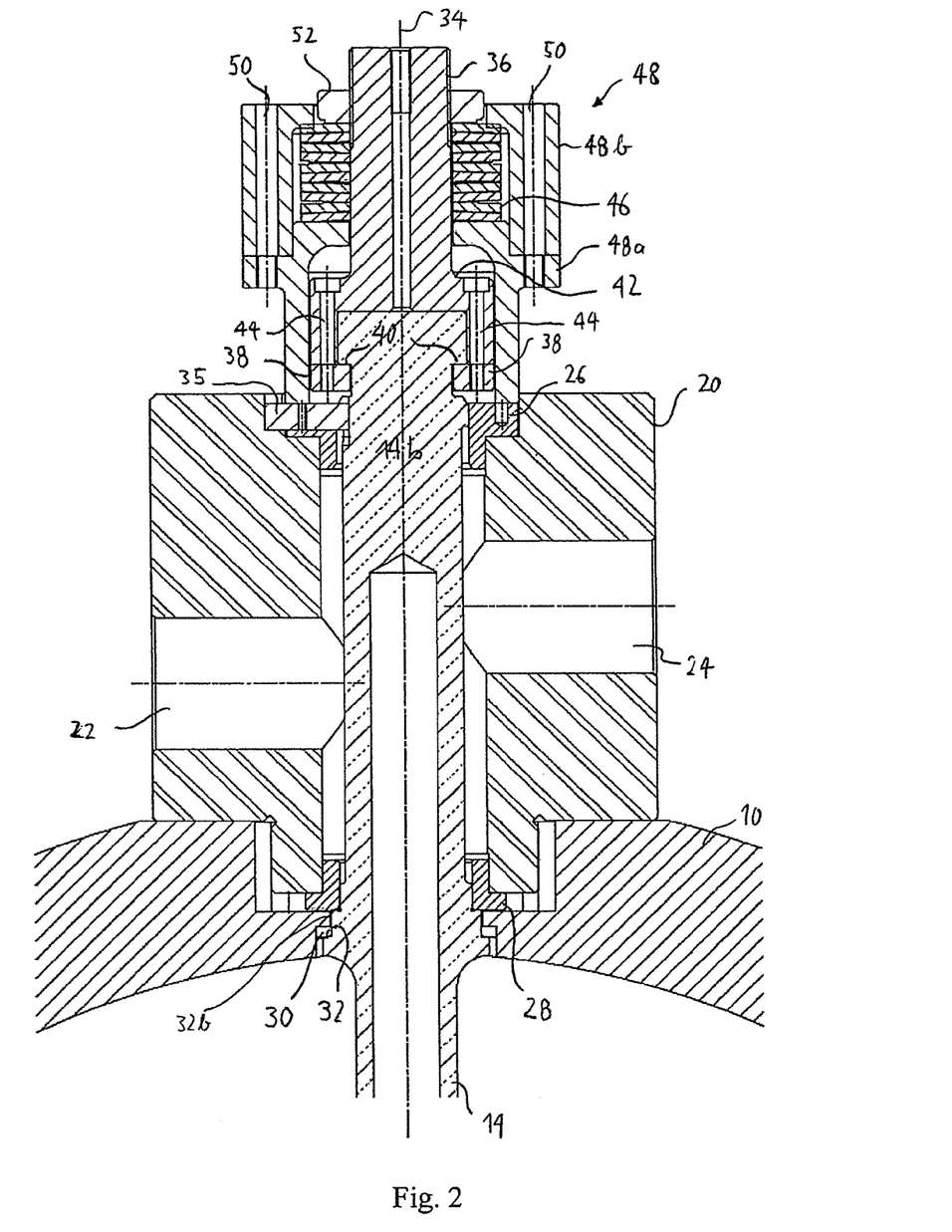
FIG. 2 is a sectional view of the mounting mechanism of FIG. 1.

In order to overcome these difficulties and manufacturing problems, the applicant has conceived an alternative design which could be produced to such a precision that after mounting the holding elements at the carrier, no further adjustments would be necessary. This way, both, the additional adjusting step after assembly as well as the need for a flexible sealing allowing for such after-assembly adjustments could be avoided. With a very high machining precision that has become recently available at affordable costs, it turned out that this ambitious design could actually be put to practice with the desired precision. FIG. 1 is a figure of a design by the applicant in which the traditional order ("assemble and adjust") has for the first time been reversed ("adjust and assemble"). A cross sectional view through girder 20 and an upper (second) end 14a of the holding element of FIG. 1 is shown in FIG. 2. As is seen in FIG. 2, in the girder 20, two transversal bores 22, 24 are provided for housing cooling water supply and discharge lines (not shown), respectively. In FIG. 2, also the cooling water ports within holding element 14 are omitted for clarity.

As is further seen in FIG. 2, an upper and a lower positioning ring 26, 28, respectively, are provided at girder 20. These positioning rings 26, 28 provide the reference surfaces for positioning the second end 14b of holding element 14 and are machined with very high precision. A seal between the holding element 14 and the vessel 10 wall is provided by a metal sealing ring 30. When the upper end 14b of the holding element 14 is in contact with the inner surfaces of the upper and lower positioning rings 26, 28, a shoulder 32 at holding element 14 compresses sealing ring 30 and a further shoulder 32b abuts lower positioning ring 28, then the precision of the machining of holding element 14, girder 20 and its positioning rings 26, 28 ensures that the drift tube 12 at the lower, first end of holding element 14 (not shown in FIG. 2) is positioned at the proper position. The proper rotational orientation along the longitudinal axis 34 is provided by a key element 35 engaging with a corresponding notch of holding element 14.

An important function of a metal seal is that it allows to provide for an RF contact for the continuity of surface currents in the vessel walls. In case that rubber seals were used, additional RF contacts in the RF cavity would have to be provided.

The applicant has realized that due to the long cantilever between the upper (second) end 14b of holding element 14 and the drift tube 12 at the first end thereof, it is important to avoid any mounting forces transverse to the longitudinal axis 34. For this, a specific mounting mechanism has been conceived which will be described next with reference to FIG. 2 as well.

An extension rod 36 is attached to the upper end 14b of the holding element 14. To attach this extension rod 36, two half circular elements 38 are provided which engage into a neck portion 40, i.e. a reduced diameter portion in the upper or second end 14b of holding element 14. Each of the two half circular elements 38 are connected with a flange portion 42 of extension rod 36 with three screws 44 each.

The extension rod 36 extends through the central openings of a stack of five pairs of belleville washers (disc springs) 46. The belleville washers 46 can be precompressed by a prestressing cylinder 48 comprised of a lower portion 48a and an upper portion 48b and connected with a total of six screws, of which only two corresponding bores 50 are shown in FIG. 2. Finally, a nut 52 is screwed onto a threaded portion on the upper end of extension rod 36 such as to be in contact with the prestressed belleville washers 46. If the screws tightening the lower and upper parts 48a, 48b of prestressing cylinder 48 together are loosened, the biasing force of the prestressed belleville washers 46 is transferred to the nut 52, thus pulling the holding element 14 axially upwards in FIG. 2 and thereby causing a sealing between the holding element 14 and the vessel 10 at the sealing ring 30 and largely avoiding off-axis forces, so that the drift tube 12 (not shown in FIG. 2, see FIG. 1) will be held in the desired position due to the guidance of the precisely machined upper and lower position rings 26, 28.

Next, the assembly or mounting of the holding element 14 carrying a drift tube 12 at girder 20 according to the prior art of FIGS. 1 and 2 shall be explained.

First, the elongate holding element 14 carrying a drift tube 12 is introduced into the vessel 10, and the first end 14b is passed through an opening in the vessel 10 and the vertical bore in the girder 20, until the first end 14b of holding element 14 stands out slightly from the top surface of girder 20. Next, the extension rod 36 is mounted to upper end 14b of holding element 14 using the two half circular members 38 and six screws 44. The reason why an extension rod 36 is employed is that the total length of holding element 14 and drift tube 12 must be less than the diameter of the vessel 10, otherwise the upper end 14b of the holding element 14 cannot be plugged into the bore in the vessel 10 and the girder 20. Further, the axial distance of the upper and lower positioning rings 26, 28 cannot be made too small, otherwise the leverage for positioning the drift tube 12 becomes too small. Accordingly, the applicant believed that such an extension rod 36 is necessary.

In a next step, the prestressing cylinder 48 loaded with prestressed belleville washers 46 is inserted over the extension rod 36, and the nut 52 is screwed on the distal end of the extension rod 36 until it abuts to the stack of prestressed belleville washers 46. Then, the screws (not shown) connecting the upper and lower parts 48b, 48a of the prestressing cylinder 48 are loosened and the upper part 48b of the prestressing cylinder 48 is removed. Consequently, the entire biasing force of the compressed belleville washers 46 is acting on the nut 52, thus pulling the holding element 14 upwards in axial direction thereof via the extension rod 36. The idea is that a predetermined mounting force can be preadjusted by prestressing the belleville washers 46 with the prestressing cylinder 48 to a certain predetermined degree. Then, if the nut 52 is only softly tightened against the uppermost belleville washer 46, the predetermined bias corresponding to the prestressing force of the prestressing cylinder will be applied to the extension rod 36 and thus to the holding element 14 after the upper part 48b of prestressing cylinder 48 is removed.

The mounting mechanism described with reference to FIGS. 1 and 2 has been invented by the inventors of the present invention and has been disclosed during the LINAC 08 Conference in Victoria, British Columbia, Canada.

With this design, it has been confirmed in a prototype that the general concept of "adjust and assemble", i.e. without adjustment after assembly, generally allows to obtain the desired positioning precision of the drift tubes. However, there are still a number of problems arising. First of all, the assembly just described is still rather cumbersome. Considering that in practice several tens or over a hundred of drift tubes would have to be mounted, the assembly is still very time consuming. Also, while it is the intention of the mounting mechanism of FIG. 2 to provide a perfectly axial mounting force of a predetermined and reproducible strength, in practice it has been found that this does not always work in a satisfying manner.

SUMMARY OF THE INVENTION

In view of the above-mentioned problem, it is an object of the invention to provide a mounting mechanism that allows for an easier mounting using fewer components and allows for generating predictable and reproducible precisely axial mounting forces. While the mounting mechanism will be explained with specific reference to mounting of a drift tube, the mounting mechanism is not limited to this application but could find use in various fields where problems with high precision mounting arise. Another typical field for employing such mounting mechanism would be the field of optics.

This problem is solved by the drift tube mounting mechanism of claim 1. Preferable embodiments are defined in the dependent claims.

Contrary to the mounting mechanism described with reference to FIGS. 1 and 2 above, the mounting mechanism of the invention comprises a screw having a head portion and a shaft portion, said shaft portion comprising a threaded portion for screwing into a second end of the holding element and a bushing comprising a sleeve portion receiving at least part of said screw shaft and separating the one or more disc spring members from said screw shaft portion part. Herein, the screw head portion is configured to receive the axial biasing force generated by the one or more disc springs.

The mounting mechanism of the invention is thus much simpler in construction than the inventors' prior design described with reference to FIGS. 1 and 2, as it allows to dispense with the extension rod, the nuts, the two half circle parts and the six screws connecting the flange portion of the extension rod with the half circle parts. The design of the present invention also allows for a much faster and simpler manufacturing and assembly.

Further, it is suspected that a functional problem with the earlier design of FIGS. 1 and 2 is caused by friction between the belleville washers and the extension rod. The amount of friction will depend on the precise position of the washers which is difficult to control within the prestressing cylinder 48 of FIG. 2. In fact, the uncontrolled friction has two disadvantages: First of all, the frictional force will reduce the mounting force with regard to the prestressing force in an uncontrolled manner. Second, depending on the position of the belleville washers, this friction will typically generate an off-axial force which in turn compromises the positioning precision of the drift tube. In contrast to this, the sleeve portion of the bushing of the invention will avoid any friction between the disc springs, such as belleville washers or the like, and the shaft of the screw. Also, the bushing can be inserted into the prestressing assembly, thus providing for an alignment of the disc springs upon their precompression even without the screw inserted therethrough. Note that a deviation of the disc spring from a concentric position may also cause off-axial forces. Using the bushing of the invention, such deviations can be reliably prevented.

Preferably, the bushing further comprises a flange portion projecting radially outward from said sleeve portion, wherein a lower side of the flange portion is adapted to receive an axial biasing force generated by the one or more disc springs and an upper side of said flange portion is adapted to transfer an axial biasing force generated by said one or more disc springs onto a portion of said screw head projecting from said shaft portion. Accordingly, the flange portion avoids direct contact between the head of the screw and the disc springs and thus allows to further reduce frictional forces when screwing the screw into the second end of the holding element.

In a preferred embodiment, the diameter of the flange portion exceeds the diameter of the screw head. The mechanism further preferably comprises a prestress member adapted to engage with a portion of said upper side of said flange portion that radially protrudes from the circumference of the screw head. Accordingly, while the prestress member and the screw head engage with different portions of the flange of the bushing, the counter force generated by each of them will be uniformly applied to the disc springs and thus avoid displacement of disc springs and off-axial forces. In fact, the transferring of load from the prestress member to the screw head remains "unnoticed" by the disc springs due to the flange portion positioned inbetween.

Preferably, the prestress member has an aperture shaped an dimensioned such that it allows said screw head to pass through but such that the axial projection of the aperture boundary overlaps with the flange portion. Due to this overlap, the prestress member allows to receive the thrust force of the spring members such as to act as a prestress member. However, the aperture is still large enough for passing the screw head, meaning that the screw can be screwed into position after the prestress member has been positioned on the girder. Note that if the screw head has a typical circular cross section, this means that the diameter of the aperture must be larger than the diameter of the screw head but smaller than the diameter of the flange portion.

In a preferred embodiment, the mounting mechanism further comprises a base member connectable with the prestress member and suitable for prestressing the one or more disc springs disposed between said base member and said prestress member. Preferably, the base member has an aperture shaped and dimensioned such that it allows the threaded portion and/or said sleeve portion of said bushing to pass through, but such that the axial projection of the aperture boundary overlaps with the one or more disc springs. For example, if the aperture has a circular shape, this feature means that its diameter is larger than that of the threaded portion and/or that of the sleeve portion but smaller than the diameter of the one or more disc springs. Accordingly, the screw can be inserted through the aperture in the base member into the holding element, preferably together with the sleeve portion of the bushing, but at the same time allows to receive an axial thrust force generated by the disc springs. If the aperture is large enough to also pass the sleeve portion of the bushing together with the threaded portion of the screw, the sleeve helps to concentrically align the disc springs upon compression between the base member and the prestress member even without the screw being inserted therethrough.

Preferably, the base member and the prestress member are connectable by connecting screws which upon tightening compress said one or more disc springs disposed there between. Herein, the connecting screws preferably are passed through said prestress member and engaged with a threaded portion provided in said base member, wherein spherical washers are provided between the head of each connecting screw and said prestress member. This avoids bending of the connecting screws at the head portions when one of the connecting screws is loosened. In fact, this allows to get along with two connecting screws only, as will be explained below with reference to a specific embodiment, thus adding to the easier mounting and reducing the number of components.

Preferably, the shaft portion of the screw has a larger diameter portion at least partially located in said sleeve portion of said bushing and having a larger diameter than said threaded portion. This facilitates the insertion of the screw through the bushing. Preferably, the threaded portion is screwed into the second end of the holding element until the shoulder of the larger diameter portion locks at the top surface or shoulder of the second end of the holding element.

Preferably, the base member has a ring-shaped supporting surface for supporting said one or more spring discs.

In a preferred embodiment, the mechanism further comprises a location element for engagement with said base member and said carrier, thereby defining a predetermined rotational orientation between the mounting mechanism and the carrier. With this location element, it can be ensured that neighboring mounting mechanisms will be aligned with each other and thus will not interfere, as will be explained in more detail with reference to an embodiment below.

BRIEF DESCRIPTION OF THE FIGURES

Further features and advantages of the invention will become apparent from the below description of a preferred embodiment with reference to the accompanying figures, in which.

DESCRIPTION OF A PREFERRED EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modification in the illustrated device and such further applications of the principles of the invention as illustrated therein being contemplated as would normally occur now or in the future to one skilled in the art to which the invention relates.

Figure 3:
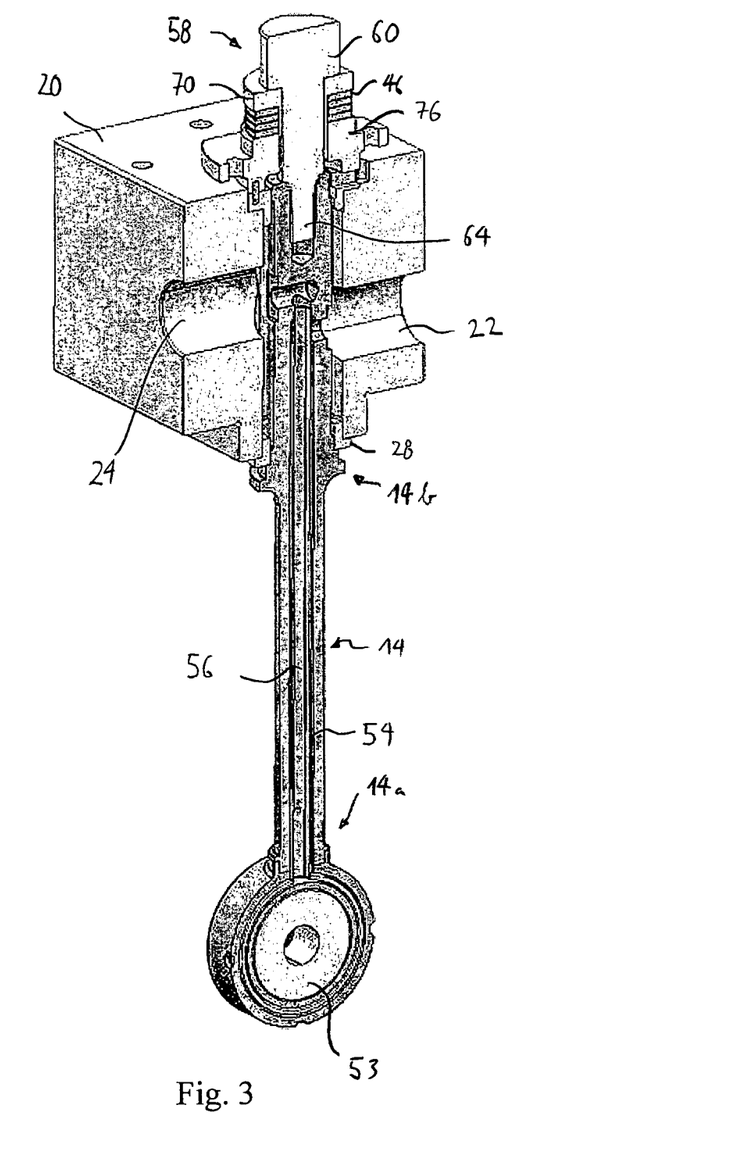
FIG. 3 is a perspective sectional view of a drift tube, a holding element, a girder and a mounting mechanism according to a preferred embodiment of the invention.
Figure 4:
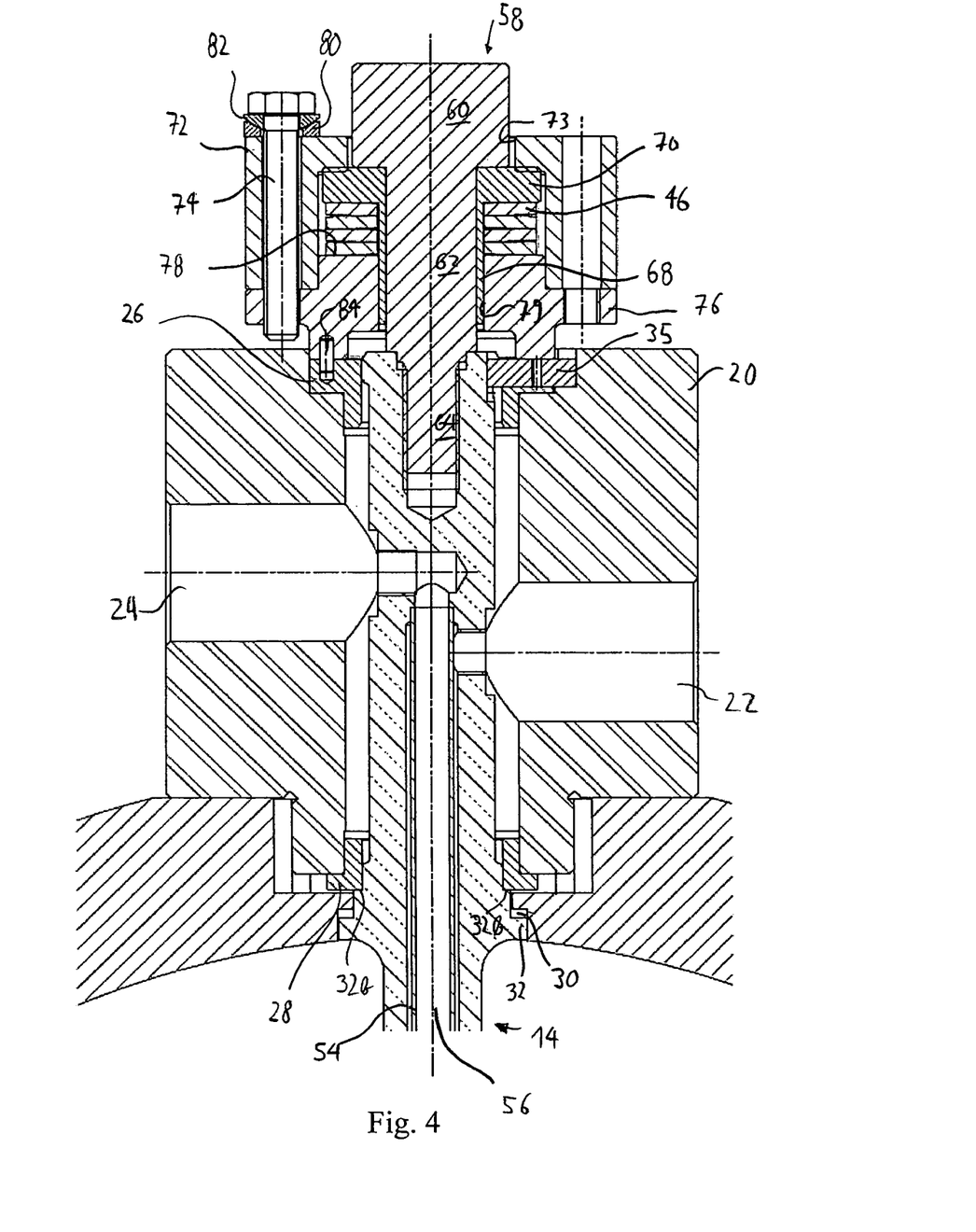
FIG. 4 is a sectional view of the mounting mechanism of FIG. 3.

In FIG. 3, a perspective sectional view of a drift tube 12, a holding element 14, a girder 20 and the mounting mechanism according to a preferred embodiment of the invention is shown. Similar or identical components as compared to the prior art described with reference to FIGS. 1 and 2 will be designated with the same reference signs. A more detailed sectional view of the mounting mechanism is shown in FIG. 4.

In the sectional view of FIG. 3, the permanent quadrupole magnet 53 can be seen. Also, in FIG. 3 and in particular, FIG. 4, the cooling water channels in the holding element 14 and drift tube 12 can be recognized. In particular, an outer cooling jacket 54 is provided, which is connectable to a water supply (not shown) that will be mounted in bore 22. After flowing around the permanent quadrupole magnet 53, the cooling water flows back through a central passage 56 and is discharged through a discharge line (not shown) that is to be mounted in bore 24.

The structure of the girder 20, upper and lower positioning rings 26, 28 and metal seal 30 is similar to that of FIG. 2 and shall therefore not be described again. However, unlike the prior art mounting mechanism of FIG. 2, the mounting mechanism shown in FIGS. 3 to 5 comprises a screw 58 comprising a head portion 60 and a shaft portion, wherein the shaft portion comprises a larger diameter portion 62 and a threaded portion 64. The diameter of the threaded portion 64 is smaller than that of the larger diameter portion 62. The threaded portion 64 is screwed into the second end 14b of the holding element 14. In particular, the threaded portion 64 of screw 58 is screwed into the second end 14b of holding element 14 until the shoulder of the larger diameter portion 62 abuts on the shoulder of the second end 14b of holding element 14.

Figure 5:
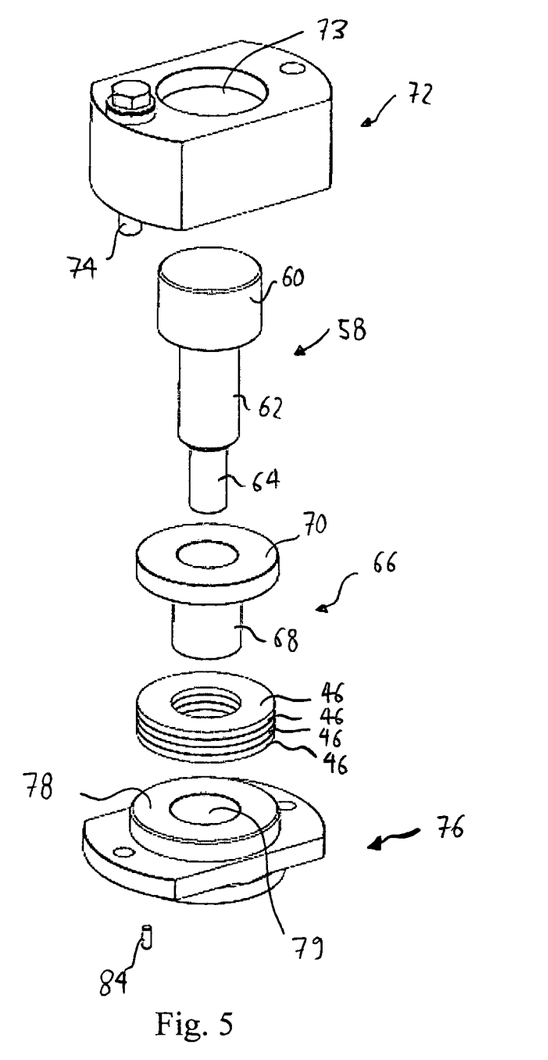
FIG. 5 is an explosion view of components employed in the mounting mechanism of FIGS. 3 and 4.
Figure 6:
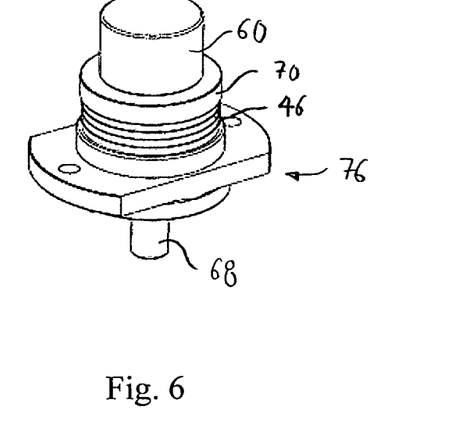
FIG. 6 shows the same components as FIG. 5 in an assembled state.

Further, a bushing 66 is provided, having a sleeve portion 68 slipped over the larger diameter portion 62 of screw 58, and a flange portion 70 projecting radially outward from the sleeve portion 68. A lower side of the flange portion 70 rests on the top surface of a stack of four belleville washers 46. Accordingly, the lower side of the flange portion 70 is adapted to receive an axial biasing force generated by the belleville washers 46 or any other type of suitable disc spring.

A radially inner portion of the upper side of flange portion 70 abuts to the lower side of head portion 60 of screw 58. Consequently, the upper side of the flange portion 70 is adapted to transfer an axial biasing force generated by the belleville washers 46 onto a portion of the screw head 60 projecting from the larger diameter shaft portion 62 of the screw 58.

Note further that the diameter of the flange portion 70 exceeds the diameter of the screw head. This leaves a radially outward portion of the upper side of flange 70 for engagement with a prestress member 72, that is connected via the connecting screws 74 (of which only one is shown in FIGS. 4 and 5) with a base member 76. The base member 76 comprises a ring shaped supporting surface 78 on which the stack of belleville washers 46 rest. The sleeve portion 68 of bushing 66 is inserted into a central opening 79 of the base member 76.

Between the head of connecting screw 74 and the prestress member 72, a pivoting or spherical washer 80 is disposed. The spherical washer 80 has a concave spherical surface in which a further washer 82 having a mating convex surface is disposed. In some applications, the convex washer 82 may be integral with the head of connecting screw 74, referred to as a "flanged screw head" in the art. The spherical washer 80 in combination with additional washer 82 or an appropriate flanged screw head allows to compensate for deviations between the longitudinal axis of connecting screw 74 and upper surface of prestress member 72 from 90°.

Further, a location element in the form of a location pin 84 engages with the base member 76 and the girder 20, more precisely the upper positioning ring 26 thereof, thereby defining a predetermined rotational orientation between the base member 76 and the girder 20.

Next, the mounting method and the function of the mounting mechanism will be described.

Prior to mounting the drift tube 12 via the holding element 14, the belleville washers 46 are placed on the ring-shaped supporting surface 78 of base member 76, and the sleeve portion 68 of bushing 66 is inserted through the central holes of the belleville washers 46 as well as through central opening 79 in the base member 76, as can be best seen in FIGS. 4 and 5. Next, the prestress member 72 is placed on the base member 76 and the connecting screws 74 are tightened, thereby compressing and thus prestressing belleville washers 46. Preferably, the belleville washers 46 are prestressed using a press acting on the base member 76 from below and on the bushing 66 from above. This way, no considerable tightening force needs to be applied to the connecting screws 74.

Note that the diameter of an aperture 73 of the prestress member 72 is larger than the hole in each of the belleville washers 46, such that only a part of the prestress member 72 overlaps with the belleville washers 46. However, since the flange 70 of bushing 66 is disposed between the belleville washers 46 and the prestress member 72, a very uniform prestressing force will be applied to the belleville washers 46 over their entire top surface, so that tilting, shifting and/or catching of the washers 46 upon prestressing is reliably prevented. Also, the bushing 66 ensures that the belleville washers 46 will be neatly concentrically aligned, which also allows to prevent tilting and catching of the washers. By fastening connecting screws 74, a predetermined prestressing force can be applied to the belleville washers 46.

When it comes to actually mounting the drift tubes 12 via holding element 14, the holding element 14 is inserted into the girder 20, and the prestressed assembly consisting of base member 76, prestress member 72, belleville washers 46 and bushing 66 is placed on top of the girder 20, where the rotational position between girder 20 and base member 76 is controlled by location pin 84. Then, all that is left to do is to insert the screw 58 through the aperture 73 in the prestress member 72 and through the sleeve portion 68 of bushing 66 and to screw its threaded portion 64 into the second end 14b of holding element 14 until the shoulder of the larger diameter portion abuts the corresponding shoulder at the second end 14b of holding element 14. Since the stack of belleville washers 46 is pre-compressed at this time, there is still a small clearance between the head portion 60 of screw 58 and flange portion 70 of bushing 66. This way, it can be confirmed by visual inspection of the clearance that the screw is at the correct position when put in place with its threaded portion 64 fully inserted into holding element 14. Note that the diameter of the aperture 73 is larger than the diameter of the head portion 60 of screw 58, so that the head 60 rests on a radially inner part of the upper side of flange portion 70 as soon as the prestress member 72 is released.

Next, the connecting screws 74 are loosened so that the compression force will be transferred from the prestress member 72 to the head 60 of the screw. Owing to the flange 70 disposed between the belleville washers 46 and both, the prestress member 72 and the screw head 60, this transfer of load between the prestress member 72 and screw head 60 will take place in a very smooth and controlled manner, without causing any relative movement of the belleville washers 46. Also, due to sleeve portion of the bushing, there will be no or very little friction between the belleville washers 46 and the larger diameter portion 62 of screw 58. Instead, practically all of the prestress biasing force will be transferred to a precisely axial force pulling the holding element 14 upwards until it tightly abuts at the metal seal 30. Since there are no off-axial forces, the position of the holding element 16 and thus the drift tube 12 can be very precisely controlled by the upper and lower positioning rings 26, 28.

In the preferred embodiment shown, the belleville washer 46 has a height of 1.5 mm in the uncompressed state and is chosen such that the resulting force from a compression of about 80% is equal to the sum of forces required to compress the metal seal 30 and to make holding element 14 precisely abut on the positioning ring 28. Note that in the linear regime of the restoration force, the spring force generated by the stack of belleville washers is dependent on the total compression path rather than the number of washers. The number of belleville washers 46 required is found from the additional distance that is required for the mounting of a metal seal 30 in the uncompressed state plus a clearance to make sure that the shoulder of the larger diameter portion 62 of screw 58 abuts on the shoulder formed on the second end 14b of holding element 14. In the embodiment shown with four belleville washers 46, a compression of 80% leaves a 20% margin on each washer providing just more than the required margin of typically 1 mm. The prestress member 72 provides this additional compression in the pre-compressed state.

For sufficiently compressing the metal seal 30, in the embodiment shown, forces of about 16 kN are required. Of course, the suitable force will depend on the type of metal seal with respect to its shape, reinforcement and metal used. An additional force of about 3 kN is required to make sure that the holding element 14 abuts properly on lower positioning ring 28. The sum of the two forces needs to be applied by the belleville washers 46 via the screw 58 to the holding element 14.

As compared to the prior art discussed with reference to FIGS. 1 and 2, it is seen that the mounting has become considerably simpler, and that the number of parts has been considerably reduced. In particular, the rather cumbersome step of mounting the extension rod 36 at the holding element 14 could be omitted with the new design.

However, the mounting mechanism of the invention is not only simpler in construction, it also has a considerably better performance. The inventors have noticed that with the design of FIG. 2, it is not easy to reliably translate the prestressing force to a precisely axial pulling force on the holding element 14. In practice, it is seen that a considerable friction may occur between the belleville washers 46 and the extension rod 36 of FIG. 2. Since this friction is not uniform in circumferential direction of the extension rod 36, this friction force will lead to an off-axial force that will compromise the mounting precision of the drift tube 12 at the first end 14a of holding element 14. Also, even a uniform friction reduces the effective pulling force and may thus lead to an inferior mounting.

It is believed that the friction between the washers 46 and extension rod 36 of the prior art design of FIG. 2 arises due to a misalignment of some of the washers 46. In fact, it is not easy to precisely align the washers 46 upon prestressing with the mechanism of FIG. 2.

In contrast to this, the bushing 66 of the invention allows to precisely align the belleville washers 46 upon prestressing. Further, any friction between the belleville washers 46 and the shaft portion of the screw 58 is prevented by the sleeve portion 68 of bushing 66. Finally, even if friction can be prevented, it is to be noted that a precisely axial thrust force will only be generated by the belleville washers 46 if they are precisely concentrically aligned. This too is ensured by the bushing 66, both during prestressing as well as upon transferring the prestressing force from the prestress member 72 to the head portion 60 of screw 58. In fact, as has been explained before, since both, the screw head 60 as well as the prestress member 72 receive the biasing force via the same flange portion 70, the transfer of load from the prestress member 72 onto the screw head 60 takes place very smoothly and in a sense "unnoticed" from the belleville washers' perspective, so that any movement of the washers upon loosening the prestress members 72 can be avoided.

In summary, the mounting mechanism according to the preferred embodiment shown in FIGS. 3 to 6 allows to generate a precisely axial mounting force of a predetermined and reproducible magnitude, at considerably reduced mounting effort.

While six screws had been used to tighten the prestressing cylinder 48 of FIG. 2, according to the preferred embodiment only two connecting screws 74 are used to fasten the prestress member 72 to the base member 76. When one of the connecting screws 74 is untightened, the prestress member 72 will be slightly tilted with regard to the base member 76. However, due to the spherical washer 80, this movement can be compensated such that the connecting screws will not be bent. This is an improvement over the design of FIG. 2, in which it has been found that the screws for tightening the prestressing cylinder 48 tend to bend during operation. The prestress member 72 is connectable to the base member 76 through two screws. Use of two wrenches in parallel, one on either screw, offset by 180° helps releasing the screws in unison. While the person applies a torque, the residual torque exercised on the prestress and base members 72 and 76 due to the fact that the screws are offset from the centre is countered by the location pin 84 in the upper positioning ring 26 thereby inhibiting radial movements.

Further, with reference to FIG. 5, please note that the prestress member 72 has an elongate shape with the longer axis corresponding to the connecting line of the two connecting screws 74. When the mounting mechanism is employed on a girder 20, the location pin 84 ensures an orientation in which the longitudinal axis of the prestress member 72 is transverse with respect to the extension direction of the girder 20. This ensures that adjacent mounting mechanisms will not interfere with each other.

As mentioned above, the mounting mechanism allows to mount the drift tube 12 in the vessel 10 with the required precision. An alignment of +/−0.3 mm for magnets inside drift tubes along an accelerating structure is required in order to accelerate all particles of a beam and to keep beam loss and thus material irradiation limited. Of these +/−0.3 mm, +/−0.1 mm is the maximum precision that can be achieved in the positioning of the accelerating structure as such on its feet (not shown). Another +/−0.1 mm is the tolerance of the magnetic center inside the magnet, thus leaving a tolerance of +/−0.1 mm for the positioning of the drift tubes within the accelerating vessel or cavities. Further, a typical diameter of the vessel 10 is 50 cm, so that the cantilever length of holding element 14 inside the vessel plus half a drift tube diameter would typically be 25 cm. Since the drift tube 12 and its holding element 14 are to be mounted from the inside of the vessel 10, the maximum length of the drift tube and its holding element 14 needs to be smaller than the diameter of the vessel 10. The part of cantilever length of the holding element 14 that lies between upper and lower positioning rings 26, 28 is typically half the cantilever length inside the vessel, approximately 12 cm in the preferred embodiment. Consequently, a positioning tolerance of +/−0.1 mm at the drift tube 12 thus translates into a positioning tolerance of +/−0.02 mm at each positioning ring 26, 28. This tolerance has to be achieved as the sum of the machining tolerance of the positioning ring 26, 28 and the clearance of the elongate holding element 14 at the height of the positioning ring 26, 28. The required machining tolerance of +/−0.01 mm is at the limit but possible with today's state of the art precision machining, thus allowing for the "adjust and assemble" scheme explained in the introduction.

In an embodiment designed by the applicant, 22 drift tubes 12 are mounted on a single girder 20 of 2 m length. The particular advantage of this design is that a precise relative positioning of drift tubes in a girder 20 can be achieved by precisely machining the position rings 26 and 28 of all drift tube positions in the girder 20 with the tolerance of +/−0.01 mm in a single machining operation. In case that reference surfaces on the girder are machined in the same operation, the drift tube position inside the vessel can be established from the reference surfaces on the girder outside the vessel.

A further advantage of the mounting mechanism of the invention is that drift tubes can be exchanged by equally precise spare elements without losing precision. No further adjustment on a measurement bench is required after the exchange operation and thus a drift tube exchange can be undertaken in a much shorter time than previously.

Also, by using a screw 58 having a larger diameter portion 62 and a threaded portion 64, the biasing force acting on the holding element 14 in the mounted state can be predefined by the length of the larger diameter portion 62. Consider a case in which a drift tube is reassembled with a seal 30 that has already been compressed before. Since the deformation of the seal 30 is typically at least partly plastic, according to the prior art assembly of FIG. 2 the compression of the seal would lead to a different mounting position of the nut 52 on the extension element 36 when the seal 30 is used a second time. Namely, the nut 52 will be screwed somewhat further onto the extension element 36 into a lower position in the representation of FIG. 2. Then, the force of the belleville washers 46 after the pre-compression is released will be higher than after the first mounting of the metal seal. Contrary to this, with the mounting mechanism of the invention, even if a slightly compressed metal seal should be reused, the biasing force in the mounted state will precisely match the nominal biasing force, as defined by the length of the large diameter part in relation to the dimensions of washers 46.

While the mounting mechanism has been described with specific reference to mounting of a drift tube in an accelerator vessel, the mounting mechanism is not limited to this specific purpose. Instead, the mounting mechanism may be advantageously employed in any device where a lever arm machined to precision needs to be positioned precisely with regard to a structure, and in particular with regard to a vacuum vessel. This may find use for other types of applicators or in other fields, in particular in the field of optics.

Although a preferred exemplary embodiment is shown and specified in detail in the drawings and the preceding specification, this should be viewed as purely exemplary and not as limiting the invention. It is noted in this regard that only the preferred exemplary embodiment is shown and specified, and all variations and modification should be protected that presently or in the future lie within the scope of the appending claims.

The invention claimed is:

1. A mounting mechanism for mounting an elongate element inserted in a structure on said structure, said elongate element having a first end and a second end,
   said mounting mechanism comprising a biasing mechanism comprising one or more disc spring members for axially biasing the elongate element with respect to the structure in an axial direction of said elongate element and towards the second end of said elongate element,
   wherein the mounting mechanism further comprises a screw having a head portion and a shaft portion, said shaft portion comprising a threaded portion for screwing into the second end of said elongate element, and
   a bushing comprising a sleeve portion receiving at least a part of said screw shaft portion and separating the one or more disc spring members from said screw shaft portion,
   wherein said screw head portion is configured to receive the axial biasing force generated by said one or more disc spring members,
   wherein said bushing further comprises a flange portion projecting radially outward from said sleeve portion,
   a lower side of said flange portion being adapted to receive an axial biasing force generated by said one or more disc spring members and/or an upper side of said flange portion being adapted to transfer an axial biasing force generated by said one or more disc spring members onto a portion of said screw head projecting from said shaft portion.

2. The mounting mechanism of claim 1, said mounting mechanism forming a drift tube mounting mechanism for mounting a drift tube provided in a drift tube accelerator vessel via an elongate holding element forming said elongate element,
   said elongate holding element having a first end carrying the drift tube and a second end to be mounted outside the accelerator vessel to a carrier.

3. The mounting mechanism of claim 1, wherein the diameter of the flange portion exceeds the diameter of the screw head.

4. The mounting mechanism of claim 1, further comprising a prestress member adapted to engage with a portion of said upper side of said flange portion that radially protrudes from the circumference of said screw head.

5. The mounting mechanism of claim 4, wherein said prestress member has an aperture shaped and dimensioned such that it allows said screw head to pass through but such that the axial projection of the aperture boundary overlaps with the flange portion.

6. The mounting mechanism of claim 4, further comprising a base member connectable with said prestress member and suitable for prestressing the one or more disc spring members disposed between said base member and said prestress member.

7. The mounting mechanism of claim 6, wherein said base member has an aperture shaped and dimensioned such that it allows said threaded portion of said screw and/or said sleeve portion of said bushing to pass through, but such that the axial projection of the boundary of aperture overlaps with the one or more disc spring members.

8. The mounting mechanism of claim 6, wherein said base member and said prestress member are connectable by connecting screws which upon tightening compress said one or more disc spring members disposed therebetween.

9. The mounting mechanism of claim 8, wherein said connecting screws are passed through said prestress member and engaged with a threaded portion provided in said base member,
   and wherein a spherical washer is provided between the head of each connecting screw and said prestress member.

10. The mounting mechanism of claim 1, wherein said shaft portion of said screw has a larger diameter portion at least partially located in said sleeve portion of said bushing and having a larger diameter than said threaded portion.

11. The mounting mechanism of claim 6, wherein said base member has a ring shaped supporting surface for supporting said one or more disc spring members.

12. The mounting mechanism of claim 6, further comprising a location element for engagement with said base member, thereby defining a predetermined rotation orientation between the mounting mechanism and the structure.

13. A mounting mechanism for mounting an elongate element inserted in a structure on said structure, said elongate element having a first end and a second end,
- said mounting mechanism comprising a biasing mechanism comprising one or more disc spring members for axially biasing the elongate element with respect to the structure in an axial direction of said elongate element and towards the second end of said elongate element,
- wherein the mounting mechanism further comprises a screw having a head portion and a shaft portion, said shaft portion comprising a threaded portion for screwing into the second end of said elongate element, and
- a bushing comprising a sleeve portion receiving at least a part of said screw shaft portion and separating the one or more disc spring members from said screw shaft portion,
- wherein said screw head portion is configured to receive the axial biasing force generated by said one or more disc spring members;
- wherein said bushing further comprises a flange portion projecting radially outward from said sleeve portion,
- a lower side of said flange portion being adapted to receive an axial biasing force generated by said one or more disc spring members and/or an upper side of said flange portion being adapted to transfer an axial biasing force generated by said one or more disc spring members onto a portion of said screw head projecting from said shaft portion;
- a prestress member adapted to engage with a portion of said upper side of said flange portion that radially protrudes from the circumference of said screw head.

14. A mounting mechanism for mounting an elongate element inserted in a structure on said structure, said elongate element having a first end and a second end, said mounting mechanism comprising:
- a biasing mechanism comprising one or more disc spring members for axially biasing the elongate element with respect to the structure in an axial direction of said elongate element and towards the second end of said elongate element,
- a screw having a head portion and a shaft portion for screwing into the second end of said elongate element, wherein said screw head portion is configured to receive an axial biasing force generated by said one or more disc spring members; and
- a bushing comprising a sleeve portion receiving at least a part of said screw shaft portion and separating the one or more disc spring members from said screw shaft portion, wherein said bushing further comprises a flange portion projecting radially outward from said sleeve portion;
- wherein a lower side of said flange portion is adapted to receive an axial biasing force generated by said one or more disc spring members, or wherein an upper side of said flange portion is adapted to transfer an axial biasing force generated by said one or more disc spring members onto a portion of said screw head projecting from said shaft portion.

15. The mounting mechanism of claim 14, further comprising:
- a prestress member adapted to engage with a portion of said upper side of said flange portion that radially protrudes from the circumference of said screw head.

\* \* \* \* \*